United States Patent Office 3,187,028
Patented June 1, 1965

3,187,028
PROCESS FOR PURIFYING TETRAMETHYL LEAD
Herman E. Collier, Jr., Newark, Del., and George S. Hammond, Pasadena, Calif., assignors to E. I. du Pont de Nemours and Company, Wilmington, Del., a corporation of Delaware
No Drawing. Filed Oct. 9, 1963, Ser. No. 314,859
7 Claims. (Cl. 260—437)

This invention relates to the purification of tetramethyl lead and particularly to a novel and highly effective method for removing sludge-forming bismuth impurity from tetramethyl lead.

Tetramethyl lead is a highly useful antiknock compound and, like tetraethyl lead, can be manufactured by alkylation of lead alloys. One general method comprises reacting methyl chloride with sodium lead alloy in the presence of an alkylation catalyst, normally an aluminum-based catalyst, as disclosed by Jarvie, Schuler and Sterling in U.S. Patent 3,048,610 and by Cook and Sistrunk in U.S. Patent 3,049,558. Much more prone to ignite and decompose explosively under certain conditions than tetraethyl lead, tetramethyl lead requires special handling.

Those skilled in the art, however, have long been aware that tetramethyl lead can be effectively stabilized for safe handling during all phases of manufacture, recovery, storage and use, by dilution with volatile hydrocarbons, halohydrocarbons and other substances, many of which are disclosed by Calingaert in U.S. Patents 2,660,591–6. Jarvie et al. above disclose recovering tetramethyl lead from the methylation reaction mass by steam distillation in the presence of toluene which codistills with the tetramethyl lead and protects it against decomposition in the vapor phase. It is also considered advantageous to collect the steam distillate in a volatile halohydrocarbon diluent having fire retardant properties. Ethylene dichloride is particularly useful in this regard and serves a dual purpose since it also has utility as a lead scavenger in the antiknock use of the tetramethyl lead.

It is disclosed, by Peck in U.S. Patent 2,293,214 and by Downing and Linch in U.S. Patent 2,407,261, among others, that tetramethyl lead, like tetraethyl lead and other tetraalkyl leads produced in like manner, tends to undergo objectionable sludging attributable to unstable alkyl bismuth impurity arising from bismuth contaminant in the lead used for its manufacture. According to prior disclosures, such sludge in general, when in conjunction with adsorbed tetraalkyl lead, often tends to ignite on exposure to oxygen or air and thus constitutes a serious fire and explosion hazard. With tetramethyl lead, sludging is believed by some to constitute an especially hazardous situation in view of the relative ease with which such compound is ignited and decomposed. On general grounds too, formation of haze and insolubles is objectionable, for such matter tends to clog delivery lines, promote corrosion of equipment and even accelerate deterioration of the organo-lead product.

To remove sludging impurities from tetraalkyl leads, Peck (noted above) discloses treatment of the impure product with certain acidic reagents. Bertolette and Parmelee in U.S. Patent 2,400,383 effect precipitation of sludge-forming bismuth impurities from tetraethyl lead by treatment with oxygen. Parmelee, in U.S. Patents 2,410,356 2,426,789 and 2,440,810, utilized the oxidizing action of aqueous hydrogen peroxide, or dichromate, perborate or chlorite salts to precipitate bismuth sludge. It will be noted that, while Peck alleges that tetramethyl lead may also be purified by acid or metal halide treatment, Bertolette and Parmelee appear to limit their disclosures to the treatment of tetraethyl lead.

To this day, the air-blowing method of Bertolette and Parmelee is practiced in the manufacture of tetraethyl lead. However, such oxidative treatment is practically without effect when applied to tetramethyl lead. The oxidizing solutions of the later Parmelee patents are also unsatisfactory for this purpose, tending either to be impractically slow in their action or to be only partially effective.

An object of this invention is to provide a novel process for purifying tetramethyl lead which contains a soluble bismuth impurity in an amount such that it normally tends to form haze and sludge during storage. Another object is to provide such a process which converts the soluble bismuth impurity into a readily removable form and which is highly effective at ordinary atmospheric temperatures. A particular object is to provide such a process for the treatment of compositions which are concentrated solutions of tetramethyl lead in normally liquid solvents which are stabilizers for the tetramethyl lead and especially solvents which include a halohydrocarbon scavenger for the lead. A further object is to provide new compositions of matter and to advance the art. Still other objects will appear hereinafter.

The above and other objects of this invention may be accomplished by the process for purifying the tetramethyl lead containing a soluble bismuth impurity in an amount such that it normally tends to form haze and insoluble sludge during storage, which process comprises (A) Intimately contacting said tetramethyl lead in the liquid phase
(B) At a temperature of from about 0° C. to about 80° C.,
(C) With from about 0.05% to about 2% by weight, based on the tetramethyl lead, of an alkane peroxycarboxylic acid of 1–6 carbon atoms, and
(D) Then separating the bismuth reaction product and the residual acid from the reaction mixture.

In a preferred aspect of this invention, the process is applied to a composition consisting essentially of about 95% to about 35% by weight of tetramethyl lead containing a soluble bismuth impurity in an amount such that it normally tends to form haze and insoluble sludge during storage, and about 5% to about 65% by weight of a normally liquid stabilizer for the tetramethyl lead which boils in the range of about 70° C. to about 250° C. and is inert to the peroxycarboxylic acid treating agent. By normally liquid is meant that the material exists as a liquid at atmospheric pressure and normal room temperature, i.e., about 25° C. Also, in a preferred embodiment of this invention, the treating agent will be the crude reaction products containing the peroxy acid obtained in the preparation of the peroxy acid.

This invention is based on the discovery that the alkane peroxycarboxylic acids as above defined are both highly selective and effective in destroying soluble bismuth impurity in the presence of rather large proportions of tetramethyl lead. In surprising contrast, the oxidizing agents of the prior art, such as oxygen, hydrogen peroxide, and salts thereof, shown to be effective in the art for the removal of bismuth from tetraethyl lead, are of little or no value in this process. Similarly, glacial acetic acid, disclosed by Peck in U.S. Patent 2,293,214, is much less effective to decrease the bismuth content of tetramethyl lead. Treatment of such impure tetramethyl lead compositions according to this invention results in a decrease in the soluble bismuth content accompanied by the appearance of haze and insoluble matter which are readily removable by conventional filtration and washing techniques. Thus, by this process, tetramethyl lead can be obtained clear and substantially free of solids-forming bismuth impurity and thus substantially free of the objectionable tendency to gradually form haze and insoluble matter during storage and handling.

The process is easy to operate and the quantities of materials, temperatures, times and intimacy of contact of the reactants are easily coordinated to reduce the bismuth content of the tetramethyl lead composition to an acceptable level, for example below 10 p.p.m. or to substantially nil if desired. Tetramethyl lead losses are normally low.

Ordinarily, the impure tetramethyl lead composition, to be treated according to this invention, will contain from about 20 to about 2000 p.p.m. (parts per million) of bismuth, more usually about 100 to about 200 p.p.m., depending on the level of Bi impurity in the lead used in its manufacture. Virgin lead normally contains about 0.02% wt. Bi (200 p.p.m.). However, the Bi content may vary considerably upwards or downwards depending on the prior processing history of the starting lead. Also, tetramethyl lead compositions containing less than 20 p.p.m. Bi can be treated and converted to substantially nil Bi products, if desired. It is believed that higher levels of Bi impurity than 2000 p.p.m., if ever encountered, can also be successfully decreased in accordance with the objects and methods of this invention.

Mainly for reasons of safety, the tetramethyl lead is preferably employed in this process as a solution in a normally liquid inert solvent which is a stabilizer for the tetramethyl lead and is inert to the reactants. Practically, the solvent usually will boil within the range of about 70° C. to about 250° C. (at atmospheric pressure), preferably in the range of about 70° C. to about 160° C. A wide variety of normally liquid stabilizers are known, as more particularly disclosed by Calingaert in U.S. Patents 2,660,591–6 and by Cook et al. in U.S. Patent 3,049,558, which are also solvents for and suitably inert towards the reactants and which may be used in this process.

Suitable stabilizer solvents for this purpose are the normally liquid saturated aliphatic and aromatic hydrocarbons and halohydrocarbons, particularly mixtures thereof and particularly those boiling in the range of about 70° C. to about 160° C. Representative hydrocarbons in this range are hexane, heptane, 2-methylhexane, octane, 3-ethylhexane, isooctane, nonane, 2,6-dimethylheptane, benzene, toluene, ethylbenzene, the xylenes, and mixtures thereof. There may also be used the essentially saturated aliphatic and aromatic industrial napthas and gasoline blending components wherein a major proportion boils over the 70° C. to 160° C. range. Halogenated analogs of the alkane and aromatic hydrocarbons, in which the halogens have atomic numbers of 17–35, are also suitable. Preferred are those having utility as scavengers for lead in the operation of spark ignition internal combustion engines, broadly those containing 2–3 bromo or chloro groups and 2–8 carbons, particularly the ethylene dihalides such as ethylene dichloride, ethylene chlorobromide and ethylene dibromide. Also, there may be used the corresponding propylene dihalides, chlorobenzene, bromobenzene and the like. It is also preferred to employ mixtures consisting essentially of two or more of the above solvents boiling within the range of about 90° C. to about 150° C. In other words, the stabilizing solvent will boil close to and preferably bracket the boiling point of tetramethyl lead.

Other diluent components, either more volatile or higher boiling than those exemplified above, may also be present, since their presence in no way affects the operability of this process. For example, there may be present the butanes, pentanes and decanes, kerosene, higher aromatics such as the methylnaphthalenes, dichlorobenzene, dibromobenzene, dichlorotoluene, and dibromotoluene. Ordinarily, such component will amount to less than 20% by weight of the solvent system but may be up to 100%.

Usually, the solvent will be a mixture of one or more hydrocarbons which are stabilizers for the tetramethyl lead and one or more alkylene dihalides in which the halogen atoms are of atomic numbers 17 to 35. In such solvent mixtures, the hydrocarbon preferably will be toluene, a gasoline fraction substantially free of olefins, or isooctane, and the alkylene dihalide preferably will be an ethylene dihalide. The most preferred solvent mixtures are those consisting essentially of toluene and either one or both of ethylene dichloride and ethylene dibromide.

The quantity of solvent material may vary widely, but, considering that tetramethyl lead is normally sold as a concentrate, undue dilution should be avoided. Practically, the solvent may account for about 5% to about 65% by weight of the composition, the rest being tetramethyl lead, i.e., about 95% to about 35% by weight of the composition. Preferably, the composition will consist essentially of about 70% to about 35% by weight of tetramethyl lead and about 30% to about 65% by weight of solvent. When, in the preferred embodiments of this invention, a hydrocarbon, such as toluene and/or isooctane, is employed in combination with a halohydrocarbon such as ethylene dichloride and/or ethylene dibromide as a solvent mixture, the hydrocarbon ordinarily will comprise about 20% to about 67% by weight of such solvent mixture, the rest being halohydrocarbons, i.e., about 80% to about 33% by weight of the solvent mixture. Preferably, the solvent mixture will consist essentially of about 33% to about 54% by weight of toluene and about 67% to about 47% by weight of either or both of ethylene dichloride and ethylene dibromide.

Representative preferred tetramethyl lead compositions consist essentially of from about 35 to about 70 wt. percent of tetramethyl lead, about 10 to about 45 wt. percent of toluene or other hydrocarbon stabilizer with the desired degree of volatility, and about 20 to about 40 wt. percent of ethylene dichloride or other halohydrocarbon solvent. Included are antiknock blend compositions such as: 57 wt. percent tetramethyl lead, 32 wt. percent ethylene dichloride and 11 wt. percent toluene; 52 wt. percent tetramethyl lead, 10 wt. percent toluene, 19 wt. percent ethylene dichloride and 19 wt. percent ethylene dibromide; 34 wt. percent tetramethylene lead, 42 wt. percent toluene and 24 wt. percent ethylene dibromide; and 34 wt. percent tetramethyl lead, 21 wt. percent isooctane, 21 wt. percent xylene and 24 wt. percent ethylene dibromide.

The process of this invention is illustrated hereinafter with peroxyacetic acid, which is commercially available, but other alkane peroxycarboxylic acids of 1–6 carbon atoms may be used in place thereof, such as peroxyformic acid, peroxypropionic acid, peroxybutyric acid, peroxyisobutyric acid, and 2-ethylperoxybutyric acid. Such peroxy acids can be prepared by the reaction of the corresponding alkane monocarboxylic acid (or anhydride) and hydrogen peroxide, usually in the presence of a strong acid catalyst, e.g., $H_2SO_4$, or by the autoxidation of the corresponding aldehyde, by conventional methods well known in the art, e.g., as disclosed on pages 627–642 of Kirk-Othmer, Encyclopedia of Chemical Technology, First Supplement, Interscience Encyclopedia Inc.

While the peroxy acids themselves may be used, this is unnecessary, and it is preferred to use the aqueous acids and, particularly, to employ the crude reaction products containing the peroxy acid as the essential component. The aqueous alkane peroxycarboxylic acids usually will consist essentially of mixtures of such acids with from about 0.1 to about 3 parts by weight of water; and may contain the other components of the reaction masses obtained in the preparation of the peroxy acid. It is particularly preferred to employ the reaction mass of the hydrogen peroxide-carboxylic acid reaction directly in the process of this invention. The composition of such reaction mass depends primarily on the concentration of hydrogen peroxide (generally used as the aqueous material) and the molar ratio of the monocarboxylic acid to the hydrogen peroxide. Typical reaction masses are comprised essentially of by weight about 10–45% peroxycarboxylic acid, about 80–30% alkane monocarboxylic acid having the same number of carbon atoms as the peroxycarboxylic acid (i.e., the alkane carboxylic acid from which the peroxy acid is derived), about 0–15% hydrogen peroxide and about 5–30% water. More usually, the ranges are about 25–45% peroxy acid, about 50–30% monocarboxylic acid, about 4–10% hydrogen peroxide and about 8–20% water. The acid catalyst, if present, may amount to about 1% by weight. As indicated, the peroxycarboxylic acid is the essential component, and any one or more of the other components listed above may be omitted completely.

The quantity of the alkane peroxycarboxylic acid employed will depend on the bismuth content of the tetramethyl lead, the time of contact allotted, the efficiency of the contact, and the degree of decrease in the bismuth content desired. The peroxy acid should be in the proportion of at least about 1 mole per atom of bismuth present and usually will be about 10 to about 100 moles, although much larger proportions, up to 500 moles or more, may be used. Usually, for convenience, there will be employed from about 0.05% to about 2% by weight of the alkane peroxycarboxylic acid based on the tetramethyl lead, preferably from about 0.1% to about 1%. Where the peroxy acid reagent used is in the form of an aqueous acid or a reaction mass obtained in the preparation of the peroxy acid, the quantity of such reagent will be that which provides the desired quantity of the peroxy acid. Water is undoubtedly a far better solvent for the peroxy acid than is the non-polar tetramethyl lead compositions. Accordingly, when peroxy acid reagents containing water are used, it will usually be desirable to employ amounts thereof which will provide substantial excess quantities of peroxy acid so as to improve the efficiency of contact of the peroxy acid with the tetramethyl lead and the bismuth therein, i.e., from about 0.1% to about 1% by weight of peroxy acid based on the tetramethyl lead, preferably from about 0.25% to about 1% by weight. The maximum amount of peroxy acid is limited solely by convenience and economics. The peroxy acid, particularly the aqueous reagents, can be used in large quantities as a wash liquor for treating successively a large number of batches of tetramethyl lead compositions.

The process of this invention is easy to operate and conveniently is conducted by mixing the alkane peroxycarboxylic acid reagent with the bismuth-containing tetramethyl lead composition, maintaining these materials in intimate contact until the bismuth content of the tetramethyl lead composition has been decreased to the desired extent, and then separating the bismuth reaction product and the residual acid from the reaction mixture to recover the purified tetramethyl lead composition, as by washing with water or aqueous alkali. Any conventional means or method for effecting intimate contact between two relatively immiscible liquids of different specific gravities may be used to obtain the intimate contact and maintain it during the reaction period, good agitation usually being sufficient. Localized contact and unduly prolonged contact beyond the time required to achieve the desired results should be avoided because it appears that the peroxy acid reagent, while highly selective in destroying the soluble bismuth impurity, is also capable of gradually reacting with the tetramethyl lead.

The reaction temperatures employed usually and preferably will be of the order of ordinary atmospheric temperatures, about 20° C. to about 40° C., but may range more widely, say from 0° C. to 80° C., preferably not above about 50° C. Cooling the reaction mass does not appear necessary but may be employed. The reaction is rapid, the time required depending primarily on the bismuth content of the starting composition, the peroxy acid concentration, the intimacy of the contact, and the results desired. Entrainment losses of volatile components can be minimized in the usual way through use of condensing means in the off-gas line.

As the soluble bismuth impurity is destroyed, haze and precipitate appear in the reaction mixture and can be readily separated from the tetramethyl lead composition by filtration and/or washing with water or dilute aqueous alkali, including the alkali metal hydroxides, carbonates and bicarbonates, and aqueous solutions of ammonia or of water-soluble amines. Both filtration and washing may be used, if desired. Such washing completely terminates the reaction. For washing, there normally is used from about 1 to about 100 volumes of a wash liquor per 100 volumes of tetramethyl lead composition. Typical wash liquors are water, aqueous solutions of sodium hydroxide containing about 1% to about 20% by weight of NaOH, and aqueous solutions of ammonia containing about 2% to about 29% by weight of $NH_3$.

The recovered tetramethyl lead composition is of high purity and highly resistant to sludging. It can be used directly in the formulation of antiknock blends with the usual addition agents such as either or both of ethylene dibromide and ethylene dichloride, and an identifying dye.

The following examples more clearly illustrate the invention, preferred modes of carrying it into effect, and the advantageous results to be obtained thereby.

EXAMPLES

Various quantities of a peroxyacetic acid reagent were added to 22.7 parts by weight of crude tetramethyl lead composition consisting essentially of, by weight, 64% tetramethyl lead (TML), 14% toluene and 22% ethylene dichloride and having a soluble bismuth content of 84 p.p.m., 131 p.p.m. based on the TML. The peroxy acid reagent consisted of, by weight, 41.1% peroxyacetic acid, 39.0% acetic acid, 4.5% $H_2O_2$, 14.4% $H_2O$ and 1.0% $H_2SO_4$. The reaction mixture was vigorously agitated at 25° C. for one hour, then washed in turn with an equal volume of water and dilute (10% wt.) aqueous NaOH to remove residual acidity. The effect of such treatment on the soluble bismuth content is shown in Table I below, wherein the TML appearance is that of the organic phase after treatment and before washing, and the quantities tabulated below are based on the tetramethyl lead (TML).

Table I

EFFECT OF PEROXY ACID TREATMENT ON TML Bi CONTENT

| Run | Peroxy Acid Conc., percent Wt. | Residual Bi, p.p.m. | TML Appearance |
| --- | --- | --- | --- |
| 1 | Blank (control) | 134 | Clear. |
| 2 | 0.083 | 77 | Slight haze. |
| 3 | 0.17 | 36 | Do. |
| 4 | 0.25 | 4.7 | Do. |
| 5 | 0.33 | 4.7 | Do. |

The washed product from Runs 4 and 5 is clear and suitable for direct use in the formulation of antiknock blends.

Table II below shows, for purposes of comparison, results obtained by agitating the same crude tetramethyl lead composition (23 parts) for 48 hours with representative oxidizing solutions (5 to 10 parts) suggested in the prior art, the quantities of residual Bi content being based on the tetramethyl lead, toluene and ethylene dichloride, combined.

Table II

EFFECT OF TREATMENT WITH OXIDIZING AGENTS, NOT OF THIS INVENTION, ON TML Bi CONTENT

Reagent:     Residual Bi content, p.p.m.
  3% aqueous hydrogen peroxide _____ 76
  Saturated aqueous calcium peroxide _____ 80
  Saturated aqueous sodium perborate _____ 33

The data also indicate that the effectiveness of the peracetic acid reagent for the purposes of this invention is not due to the presence of hydrogen peroxide in the reagent employed to obtain the results shown in Table I.

It should also be noted that the peroxy acid is significantly more effective than the acetic acid reagent, disclosed by Peck in U.S. Patent 2,293,214. For example, 23.5 parts of a tetramethyl lead composition, similar to that given above and containing 66 p.p.m. soluble bismuth, was mixed and agitated at 25° C. for one hour with 7 parts by weight of either glacial acetic acid or the peracetic acid solution described above. The bismuth content was 55 p.p.m. after treatment with the glacial acetic acid and 44 p.p.m. after treatment with the peracetic acid solution.

Finally it should be noted that simply aerating the crude tetramethyl lead composition, as described in the art for debismuthizing tetraethyl lead, is practically without significant affect on the soluble bismuth content. For comparison with the method of this invention, approximately 202 grams of a composition consisting essentially of 65 wt. percent tetramethyl lead, 14 wt. percent toluene, and 22 wt. percent ethylene dichloride and containing roughly 87 p.p.m. of sludge-forming soluble bismuth, was treated at 25–27° C. with a stream of air at a flow rate of 0.57 liter/min. sufficient to provide good contact of the gas-liquid phases. After 30 minutes, the residual Bi content was 86 p.p.m. and, after 45 minutes, 83 p.p.m. Thus, aeration, which is effective for debismuthizing tetraethyl lead, is practically without significant affect on the soluble Bi content of tetramethyl lead.

It will be understood that the foregoing examples are given for illustrative purposes solely and that this invention is not limited to the specific embodiments described therein. On the other hand, it will be readily apparent to those skilled in the art that, subject to the limitations set forth in the general description, many variations and modifications can be made in the materials, conditions, and procedures employed without departing from the spirit or scope of this invention.

From the foregoing description, it will be apparent that this invention provides a novel process for removing bismuth impurity from tetramethyl lead and concentrates thereof and which produces highly stable tetramethyl lead compositions. The process is highly effective, simple, economical and can be carried out with a minimum of hazard. Accordingly, it will be apparent that this invention constitutes a valuable contribution to and advance in the art.

The embodiments of the invention in which an exclusive property or privilege is claimed are defined as follows:

1. The process for purifying a composition which consists essentially of
    (I) about 95% to about 35% by weight of tetramethyl lead containing a soluble bismuth impurity in an amount such that it normally tends to form haze and insoluble sludge during storage, and
    (II) about 5% to about 65% by weight of a normally liquid stabilizer solvent for the tetramethyl lead which boils in the range of about 70° C. to about 250° C.,
which process comprises
    (A) intimately contacting said composition in the liquid phase
    (B) at a temperature of from about 0° C. to about 80° C.,
    (C) with a peroxy acid reagent which consists essentially of about 10% to about 45% by weight of an alkane peroxycarboxylic acid of 1–6 carbon atoms, about 80% to about 30% by weight of an alkane carboxylic acid of the same number of carbon atoms as the peroxycarboxylic acid, 0% to about 15% by weight of hydrogen peroxide, and about 5% to about 30% by weight of water, said reagent being employed in an amount to provide from about 0.05% to about 2% by weight, based on the tetramethyl lead, of the alkane peroxycarboxylic acid, and
    (D) then separating the bismuth reaction product and the residual acid from the reaction mixture.

2. The process for purifying a composition which consists essentially of
    (I) about 95% to about 35% by weight of tetramethyl lead containing a soluble bismuth impurity in an amount such that it normally tends to form haze and insoluble sludge during storage, and
    (II) about 5% to about 65% by weight of a normally liquid stabilizer solvent for the tetramethyl lead which boils in the range of about 70° C. to about 250° C.,
which process comprises
    (A) intimately contacting said composition in the liquid phase
    (B) at a temperature of from about 0° C. to about 80° C.,
    (C) with a peroxy acid reagent which consists essentially of about 25% to about 45% by weight of an alkane peroxycarboxylic acid of 1–6 carbon atoms, about 50% to about 30% by weight of an alkane carboxylic acid of the same number of carbon atoms as the peroxycarboxylic acid, about 4% to about 10% by weight of hydrogen peroxide, and about 8% to about 20% by weight of water, said reagent being employed in an amount to provide from about 0.05% to about 2% by weight, based on the tetramethyl lead, of the alkane peroxycarboxylic acid, and
    (D) then separating the bismuth reaction product and the residual acid from the reaction mixture.

3. The process for purifying a composition which consists essentially of
    (I) about 95% to about 35% by weight of tetramethyl lead containing a soluble bismuth impurity in an amount such that it normally tends to form haze and insoluble sludge during storage, and
    (II) about 5% to about 65% by weight of a normally liquid stabilizer solvent for the tetramethyl lead which boils in the range of about 70° C. to about 250° C.,
which process comprises
    (A) intimately contacting said composition in the liquid phase
    (B) at a temperature of from about 0° C. to about 80° C.,
    (C) with a peroxyacetic acid reagent which consists essentially of about 10% to about 45% by weight of peroxyacetic acid, about 80% to about 30% by weight of acetic acid, 0% to about 15% by weight of hydrogen peroxide, and about 5% to about 30% by weight of water, said reagent being employed in an amount to provide from about 0.05% to about 2% by weight, based on the tetramethyl lead, of the peroxyacetic acid, and
    (D) then separating the bismuth reaction product and the residual acid from the reaction mixture.

4. The process for purifying a composition which consists essentially of
    (I) about 95% to about 35% by weight of tetramethyl lead containing a soluble bismuth impurity in an amount such that it normally tends to form haze and insoluble sludge during storage, and
    (II) about 5% to about 65% by weight of a normally liquid stabilizer solvent for the tetramethyl lead which boils in the range of about 70° C. to about 250° C.,
which process comprises
    (A) intimately contacting said composition in the liquid phase
    (B) at a temperature of from about 20° C. to about 40° C., (C) with a peroxyacetic acid reagent which consists essentially of about 25% to about 45% by weight of peroxyacetic acid, about 50% to about 30% by weight of acetic acid, about 4% to about 10% by weight of hydrogen peroxide, and about 8% to about 20% by weight of water, said reagent being employed in an amount to provide from about 0.1% to about 1% by weight, based on the tetramethyl lead, of the peroxyacetic acid, and (D) then separating the bismuth reaction product and the residual acid from the reaction mixture.

5. The process for purifying a composition which consists essentially of (I) about 70% to about 35% by weight of tetramethyl lead containing a soluble bismuth impurity in an amount such that it normally tends to form haze and insoluble sludge during storage, and (II) about 30% to about 65% by weight of a normally liquid solvent for the tetramethyl lead which consists essentially of a mixture of (a) about 20% to about 67% by weight of at least one normally liquid hydrocarbon which boils in the range of about 70° C. to about 250° C. and is a stabilizer for tetramethyl lead and (b) about 80% to about 33% by weight of at least one normally liquid halohydrocarbon which is a scavenger for lead, which process comprises (A) intimately contacting said composition in the liquid phase (B) at a temperature of from about 0° C. to about 80° C., (C) with a peroxy acid reagent which consists essentially of about 10% to about 45% by weight of an alkane peroxycarboxylic acid of 1–6 carbon atoms, about 80% to about 30% by weight of an alkane carboxylic acid of the same number of carbon atoms as the peroxycarboxylic acid, 0% to about 15% by weight of hydrogen peroxide, and about 5% to about 30% by weight of water, said reagent being employed in an amount to provide from about 0.05% to about 2% by weight, based on the tetramethyl lead, of the alkane peroxycarboxylic acid, and (D) then separating the bismuth reaction product and the residual acid from the reaction mixture.

6. The process for purifying a composition which consists essentially of (I) about 70% to about 35% by weight of tetramethyl lead containing a soluble bismuth impurity in an amount such that it normally tends to form haze and insoluble sludge during storage, and (II) about 30% to about 65% by weight of a normally liquid solvent for the tetramethyl lead and which consists essentially of a mixture of (a) about 20% to about 67% by weight of toluene and (b) about 80% to about 33% by weight of at least one ethylene dihalide in which the halogen atoms are of atomic numbers 17 to 35, which process comprises (A) intimately contacting said composition in the liquid phase (B) at a temperature of from about 20° C. to about 40° C., (C) with a peroxy acid reagent which consists essentially of about 10% to about 45% by weight of an alkane peroxycarboxylic acid of 1–6 carbon atoms, about 80% to about 30% by weight of an alkane carboxylic acid of the same number of carbon atoms as the peroxycarboxylic acid, 0% to about 15% by weight of hydrogen peroxide, and about 5% to about 30% by weight of water, said reagent being employed in an amount to provide from about 0.1% to about 1% by weight, based on the tetramethyl lead, of the alkane peroxycarboxylic acid, and (D) then separating the bismuth reaction product and the residual acid from the reaction mixture.

7. The process for purifying a composition which consists essentially of (I) about 70% to about 33% by weight of tetramethyl lead containing a soluble bismuth impurity in an amount such that it normally tends to form haze and insoluble sludge during storage, and (II) about 30% to about 65% by weight of a normally liquid solvent for the tetramethyl lead and which consists essentially of a mixture of (a) about 20% to about 67% by weight of toluene and (b) about 80% to about 33% by weight of at least one ethylene dihalide in which the halogen atoms are of atomic numbers 17 to 35, which process comprises (A) intimately contacting said composition in the liquid phase (B) at a temperature of from about 20° C. to about 40° C., (C) with a peroxyacetic acid reagent which consists essentially of about 25% to about 45% by weight of peroxyacetic acid, about 50% to about 30% by weight of acetic acid, about 4% to about 10% by weight of hydrogen peroxide, and about 8% to about 20% by weight of water, said reagent being employed in an amount to provide from about 0.1% to about 1% by weight, based on the tetramethyl lead, of the peroxyacetic acid, and (D) then separating the bismuth reaction product and the residual acid from the reaction mixture.

References Cited by the Examiner

UNITED STATES PATENTS 2,293,214  8/42  Peck _____ 260—437
3,085,069  4/63  Mattison _____ 260—437

TOBIAS E. LEVOW, *Primary Examiner.*